J. P. HARNLY.
STEAM TRAP.
APPLICATION FILED DEC. 1, 1911.
1,048,531.
Patented Dec. 31, 1912.
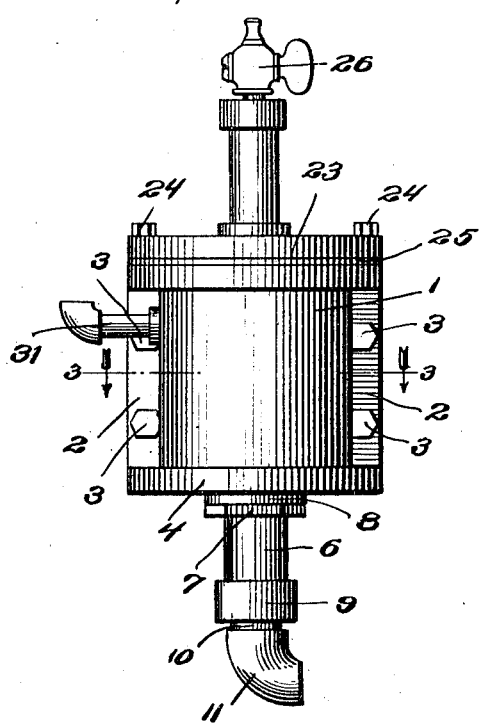
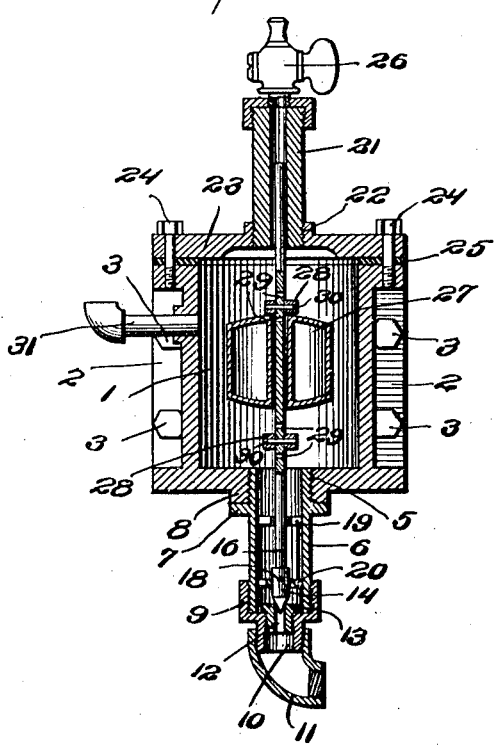
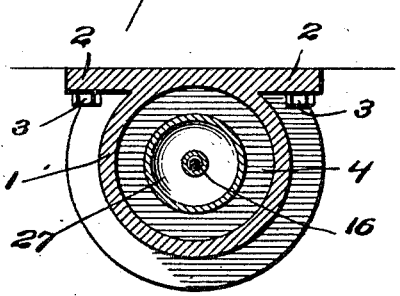
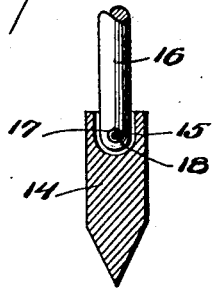
Witnesses
H. Strauss
C. R. Ziegler.
Inventor
John P. Harnly
By Joshua R. H. Potts.
Attorney

UNITED STATES PATENT OFFICE.

JOHN P. HARNLY, OF PHILADELPHIA, PENNSYLVANIA.

STEAM-TRAP.

1,048,531. Specification of Letters Patent. Patented Dec. 31, 1912.

Application filed December 1, 1911. Serial No. 663,206.

*To all whom it may concern:*

Be it known that I, JOHN P. HARNLY, a citizen of the United States, residing at Philadelphia, in the county of Philadelphia and State of Pennsylvania, have invented certain new and useful Improvements in Steam-Traps, of which the following is a specification.

My invention relates to improvements in steam traps, the object of the invention being to provide a trap which may care for any steam system, and which will automatically open and discharge water of condensation which accumulates in the trap.

A further object is to provide improved mounting for the float operated valve which enables the valve and its seat to be readily removed and changed or repaired without disturbing the main portion of the trap.

A further object is to provide an improved steam trap which embodies in its construction, simplicity, strength and durability, and which may be easily repaired by any one of average intelligence.

With these and other objects in view, the invention consists in certain novel features of construction and combinations and arrangements of parts, as will be more fully hereinafter described and pointed out in the claims.

In the accompanying drawings: Figure 1, is a view in front elevation illustrating my improved trap. Fig. 2, is a view in vertical longitudinal section. Fig. 3, is a view in cross section on the line 3—3 of Fig. 1, and Fig. 4, is an enlarged sectional view illustrating the valve and its connection with its operating rod.

1, represents the casing of my improved trap which is internally of cylindrical form, and which may, of course, be supported in various ways. I have illustrated a simple manner of supporting the casing, which consists of integral webs 2 on the body of the casing which are secured by bolts 3 projected through said webs. The bottom 4 of the casing is made with a screw-threaded central opening 5, to receive the threaded upper end of a pipe 6. This pipe 6 is made with an annular flange 7 to bear tightly against a boss 8 on the bottom 4, and form a steam and water tight juncture. The lower end of the pipe 6 is externally screw-threaded and adapted to engage internal threads in a coupling 9, and the latter has an externally and internally screw-threaded reduced lower end 10 which is screwed into an elbow 11 which constitutes an outlet for water. In the reduced end 10, a valve seat 12 is screwed, and this valve seat is in the form of a nipple having a restricted passage therethrough for water, and provided on its upper end with an angular flange 13 to receive an ordinary wrench to screw the valve seat into the coupling. This valve seat is normally engaged by a valve 14. This valve 14, throughout the greater portion of its length, is cylindrical, but at its lower end is made conical to snugly fit the valve seat. The upper end of the valve 14 is recessed as shown at 15 for the accommodation of the lower end of a rod 16. The rod 16 is of appreciably less diameter than the recess 15, and is provided with an opening 17 appreciably larger than a pin 18, which is projected through said opening and the valve. This connection between the valve and the rod enables the valve a certain amount of lateral motion, so that it will properly center itself in the valve seat, the conical end of the valve insuring a tight juncture between the valve and its seat.

In the pipe 6, two spiders 19 and 20 respectively are fixed, and are each provided with central bearings, the upper spider 19 constituting a guide for the rod 16, and the lower spider 20 constituting a guide for the valve 14.

The rod 16 extends through the casing 1, and up into a pipe 21 which is screwed into a threaded opening 22 in the center of a top plate 23. This top plate 23 is secured by bolts 24 to the casing 1, and is suitably packed by means of a gasket 25. A pet cock 26 is secured on the upper end of the pipe 21, and it is to be understood that while this pipe 21 serves as a guide for the rod 16, the diameter of the rod is sufficiently smaller than the internal diameter of the pipe to allow an escape of steam through the pet cock whenever desired.

A hollow metal float 27 is mounted to move vertically on the rod 16 between rings 28, and these rings are capable of adjustment on the rod. I have illustrated a simple construction whereby these rings may be adjusted, namely, I provide the rod with a plurality of openings 29, and the rings with pins 30, said pins may be positioned through any of the openings 29, and the movement of the valve on the rod may be adjusted to suit conditions.

An inlet pipe 31 communicates with the casing 1, and is adapted to be connected with the lowest point in the steam system, so that any water, the result of condensation in the system, will flow by gravity into the casing 1.

As the water accumulates in the casing 1, the float 27 will rise until it engages the upper ring 28. A continued accumulation of water in the casing will cause the valve to move the rod 16 upwardly, and lift valve 14 from its seat 12. The water in the casing 1 will therefore escape through pipe 6, and elbow 11 to any suitable point of discharge, and as the water falls in the casing, float 27 will descend, striking the lower ring 28, and moving the valve 14 to closed position. The operation of the trap is therefore automatic, the valve opening as water accumulates and closing as it is discharged.

One of the great advantages of my structure is the fact that it may be so readily repaired. The valve 14, and its seat 12 are located within a part of the structure which is below the body of the casing, and this portion of the structure may be readily removed without interfering with the float and its coöperating rod in the casing. If a new valve seat is necessary, the coupling 9 may be unscrewed from the pipe 6, and the old valve seat removed and a new one screwed into place. If a valve is to be repaired, after coupling 9 is removed, the valve may be drawn downwardly and repaired without disturbing any other part of the construction. Furthermore, such a construction enables an easy inspection of the trap at all times, because it is simply necessary to unscrew the coupling 9, when the condition of the valve and its seat can be readily observed, and if necessary, repairs made.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a steam trap, the combination with a casing, a pipe screwed into the lower end of the casing, a coupling screwed onto the lower end of the pipe, a valve seat in said coupling, a conical valve engaging said seat, and having a circular recess in its upper end, a float in the casing controlling the movement of the valve, a rod of less diameter than the recess in the valve and having an opening near its end, a pin of less diameter than the opening in the rod, positioned through said opening and securing the rod in the recessed end of the valve, said rod projecting through the float, rings on said rod at opposite sides of the float, said rod having a plurality of openings, and pins in said rings adapted to be positioned through any of said openings, a top plate on said casing, having a screw-threaded central opening, a pipe screwed into said opening and constituting a guide for the rod, and a pet cock on the upper end of said last-mentioned pipe, substantially as described.

2. In a steam trap, the combination with a casing, a pipe screwed into the lower end of the casing, a coupling screwed onto the lower end of the pipe, a valve seat in said coupling, a conical valve engaging said seat and having a circular recess in its upper end, a float in the casing controlling the movement of the valve, a rod of less diameter than the recess in the valve and having an opening near its end, a pin of less diameter than the opening in the rod, positioned through said opening and securing the rod in the recessed end of the valve, said rod projecting through the float, rings on said rod at opposite sides of the float, and spiders in said pipe having central guides for the rod and valve respectively, a top plate on said casing, having a screw-threaded central opening, a pipe screwed into said opening and constituting a guide for the rod, and a pet cock on the upper end of said last-mentioned pipe, substantially as described.

In testimony whereof I have signed my name to this specification in the presence of two subscribing witnesses.

JOHN P. HARNLY.

Witnesses:
GEO. L. HARNLY,
CHAS. E. POTTS.